United States Patent
Laursen et al.

(10) Patent No.: US 6,288,718 B1
(45) Date of Patent: Sep. 11, 2001

(54) SCROLLING METHOD AND APPARATUS FOR ZOOM DISPLAY

(75) Inventors: Andrew L. Laursen, San Matoe, CA (US); Craig Payne, Park City, UT (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/191,311

(22) Filed: Nov. 13, 1998

(51) Int. Cl.$^7$ ............................................. G06F 3/14
(52) U.S. Cl. ..................... 345/347; 345/341; 345/342; 707/1
(58) Field of Search ................... 345/341, 968, 345/353, 357, 340, 352

(56) References Cited

U.S. PATENT DOCUMENTS

| | | | |
|---|---|---|---|
| Re. 36,653 | * 4/2000 | Heckel et al. | 345/340 |
| 5,263,174 | * 11/1993 | Layman | 395/800 |
| 5,418,549 | * 5/1995 | Anderson et al. | 345/145 |
| 5,544,358 | * 8/1996 | Capps et al. | 395/600 |
| 5,636,350 | * 6/1997 | Eick et al. | 395/356 |
| 5,825,355 | * 10/1998 | Palmer et al. | 345/356 |
| 5,867,164 | * 2/1999 | Bornstein et al. | 345/357 |
| 5,911,485 | * 6/1999 | Rossmann | 341/22 |
| 5,923,327 | * 7/1999 | Smith et al. | 345/341 |
| 6,049,796 | * 4/2000 | Siitone et al. | 707/3 |
| 6,061,163 | * 5/2000 | Wagner et al. | 345/341 |

OTHER PUBLICATIONS

Geo Wiederhold, Database Design, 1983,McGraw–Hill, p.94.*
Microsoft Press Computer Dictionary Third Edition, Microsoft Press, 1997, p.247.*

* cited by examiner

*Primary Examiner*—John Breene
*Assistant Examiner*—Susan Rayyan
(74) *Attorney, Agent, or Firm*—Joe Zheng; Alan D. Minsk

(57) ABSTRACT

According to one aspect of the disclosed system, a user supplies character-based queries to retrieve and display a record from a structured database. For every character the user enters, a progressively reduced list of indexes that start with the entered characters is displayed. When a desired index identifying the record is among those indexes being displayed, the user may cease the character entry and scroll a zoom window upon the desired index to explore the record. According to another aspect of the disclosed system, the zoom window maintains a display of an index and at least one field of a record. Consequently, the user can access and display pertinent information of a certain record from a database quickly and efficiently with less keystrokes.

25 Claims, 13 Drawing Sheets

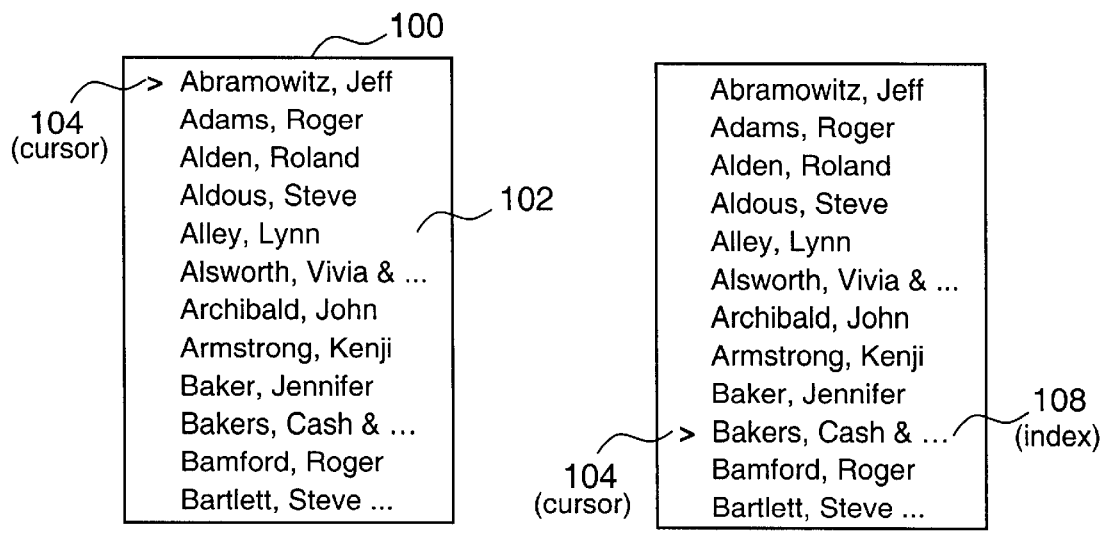
Fig. 1A  Fig. 1B
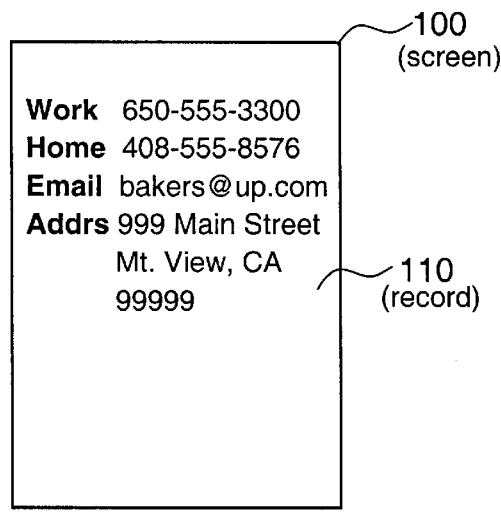
Fig. 1C

Abramowitz, Jeff
Adams, Roger
Alden, Roland
Aldous, Steve
Alley, Lynn
Alsworth, Vivia & ...
Archibald, John
Armstrong, Kenji
Baker, Jennifer
Bakers, Cash & ...
Bamford, Roger
Bartlett, Steve ...
Basart, Ed
Baumann, Bill ...
Bayar, Doris

```
          ▼ 15/175
Abramowitz, Jeff
Adams, Roger
Alden, Roland                    310
Aldous, Steve
Alley, Lynn
Alsworth, Vivia & ...
Archibald, John
                                 311
Armstrong, Kenji
Work    650-555-8372
Baker, Jennifer
```
*Fig. 5A*

```
          ▲ 15/175
Armstrong, Kenji
Baker, Jennifer
Work    650-555-5574
Bakers, Cash & ...
Bamford, Roger
Bartlett, Steve ...
Basart, Ed
Baumann, Bill ...
Bayar, Doris
```
*Fig. 5B*

```
          ▲ 15/175
Armstrong, kenji
Baker, Jennifer
Bakers, Cash & ...
Bamford, Roger
Bartlett, Steve ...
Basart, Ed
Baumann, Bill ...
                                 311
Bayar, Doris
Work    650-555-4667
```
*Fig. 5C*

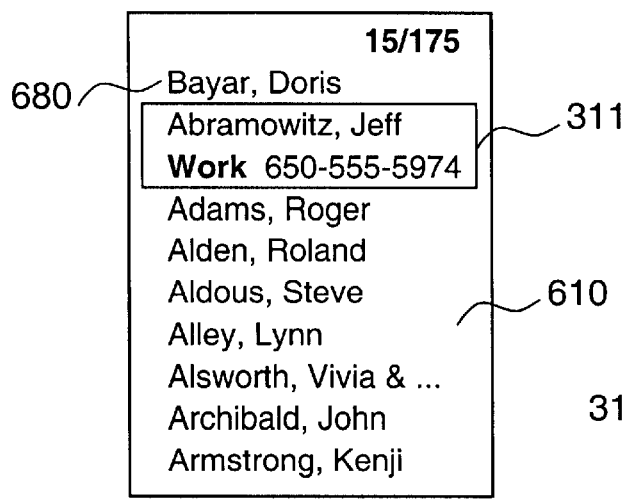
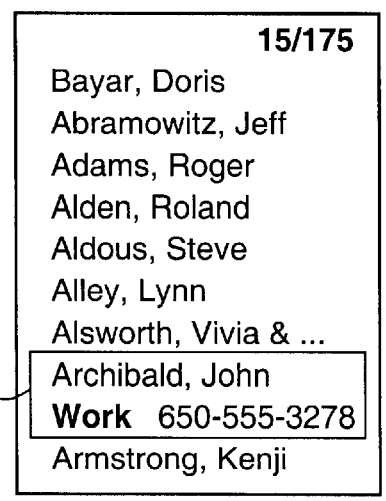
*Fig. 6A*    *Fig. 6B*
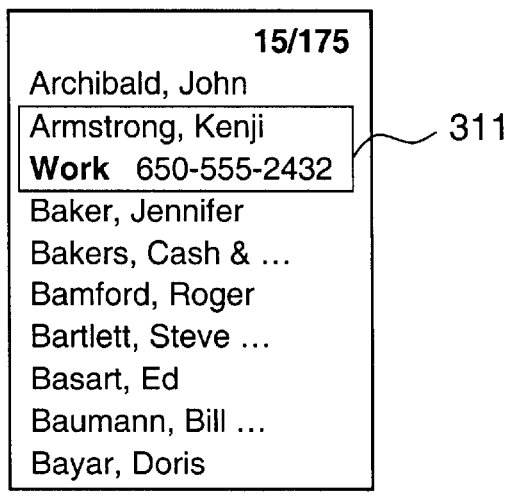
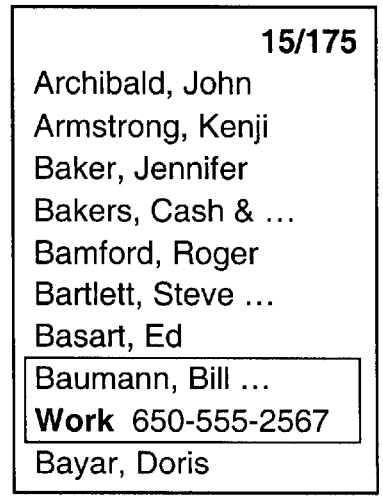
*Fig. 6C*    *Fig. 6D*

This is item 1 having a text body to show the contents.
This is item 2 having a text body to show the contents
This is item 3 having a text body to show the contents
This is item 4 having a text body to show the contents
This is item 5 having a text body to show the contents
This is item 6 having a text body to show the contents
This is item 7 having a text body to show the contents
This is item 8 having a text body to show the contents

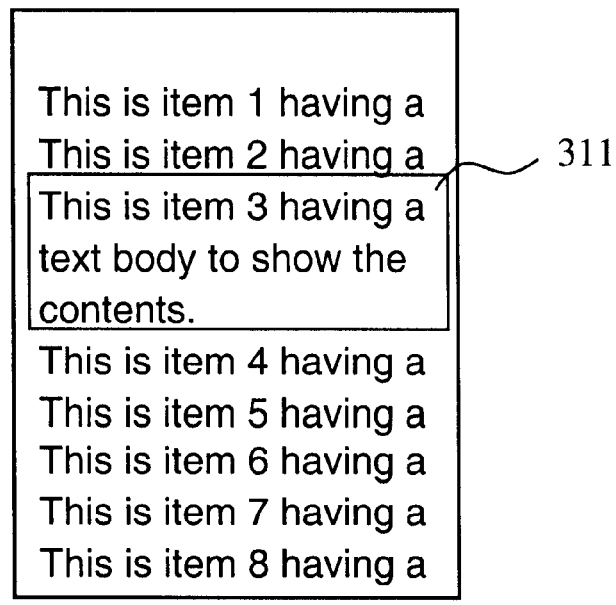

*Fig. 11B*

SCROLLING METHOD AND APPARATUS FOR ZOOM DISPLAY

BACKGROUND OF THE INVENTION

1. Field of the Invention

The present invention relates generally to the display of information on small display screens, and in particular to a method and apparatus for scrolling a zoom window through a list of items on a small screen, and at the same time displaying within the zoom window a pertinent portion of the record from a structured database.

2. Description of Related Art

A structured information database is usually represented by a long list of ordered data or records. More often, it is represented by a list of indexes, pointers, indicators, items or entries, each indexing one of the records. In order to locate a record identified by an index from the database, a string of characters representing a portion or full of the index must be supplied. A lookup process based on the matching scheme is then followed to retrieve all records identified by the string of characters. Furthermore, a scrolling process can be applied at any time to navigate through a list of indexes. It provides user a speed access to a record when its index is displayed on the screen.

As alternatively used herein, an index, a pointer, an indicator, an item or an entry means an indexing representation of a record containing collective information FIG 1A.

Illustrates a display screen 100 with a list of items 102 being displayed. Each of items corresponds to a record. In order to locate a record by a desired index from the database, a cursor 104 must be scrolled to the desired item or index. FIG. 1B shows an exemplary screen in which the desired index is "Bakers, Cash & . . . " 108 being selected by cursor 104. A user has to engage in a mode for displaying the full record of the selected index in order to obtain pertinent information. FIG. 1C shows the full record 110 of the selected index after the user activities a predefined key. The display screen allows the user to view and seek the desired information through all portions of record. After viewing the record, user has to disengage the current display mode and to return back to the previous scrolling display screen FIG. 1B to resume the scrolling process.

This method, commonly seen in some devices, is attempted to enable user to adapt to the information being structured and to review the information in a way that a scrolling process works by navigating through a list of indexes and selectively viewing individual record, which may contain desired information. Obviously, when navigating or scrolling, a user is not able to view the content of record unless temporarily suspending the scrolling process and then engaging in a mode for full record display. The full record display screen contains all portions of information in a record. Quite often only a small portion of the record is pertinent to the user, for example a phone number in an address record. Further, when the user frequently "enters" the full record display screen or "returns" to the scrolling screen, the screen display is changed or refreshed each time the display mode changes, which causes certain degrees of visual disturbance to the screen viewer (user).

For devices, such as cellular phones or two-way pagers, that are equipped with a small screen, the above scrolling method might be practical but neither convenient nor efficient. There is therefore a great need for a generic solution, for devices with small screens, to facilitate a user to navigate through a list of items and to view only a desired portion of a record without causing the visual disturbance to the user.

SUMMARY OF THE INVENTION

The present invention has been made in consideration of the above described problems and needs and has particular applications to portable devices with a small screen and a limited input interface. The portable devices, that may include, but not be limited to, mobile computing devices, cellular phones, palm-sized computer devices, personal digital assistant devices and Internet-capable appliance remote controllers, allow users to interact with the screen and input interface to obtain pertinent information.

According to one aspect of the present invention, a user supplies a few character-based queries to retrieve and display a record from a structured database. For every alphabetical character the user enters from a numerical keypad, a progressively reduced list of items that start with the entered characters is displayed. When a desired index identifying the record is among those items being displayed, the user may cease the character entry and scroll a zoom window upon the desired index to explore the record. According to another aspect of the present invention, the zoom window maintains a display of an index and at least one field of a record. Consequently, the user can access and display pertinent information of a certain record from a database quickly and efficiently with minimum keystrokes.

According to one embodiment, the present invention is a method for displaying a record from a structured database on a screen, the record including at least one field and indexed by a desired index comprising a string of characters, the method comprising:

displaying on the screen a portion of items from the structured database;

receiving a first symbol if the desired index is not among the items being displayed in the screen; the first symbol representing a first group of characters one of which is a first character in the string of characters of the desired index; and indicating the desired index with a cursor when the desired index is among the items being displayed in the screen and the cursor is scrolled to the desired index.

In one preferred embodiment, the cursor is a zoom window that surrounds the desired index. The zoom window may further display one field of information of the record to facilitate the display of a piece of pertinent information in the record.

According to another embodiment, the present invention is an apparatus for displaying a desired record from a structured database on a screen, the record including at least one field and indexed by a predefined index comprising a string of characters, the device comprising:

a screen driver commanding the screen;

an input interface;

a memory for storing code for an application module;

a processor coupled to the memory, the input interface and the screen driver, the processor executing the code in the memory to cause the application module to drive the screen driver to display on the screen a portion of items from the structured database;

position a zoom window on one of the items being displayed on the screen; wherein the zoom window displays the one of the items along with a field of a record indexed by the one of indexes; and move the zoom window to the desired index when a navigation key is being activated and the desired index is among the items being displayed in the screen; wherein the zoom window displays the desired index and the at least one field of the desired record.

Accordingly, one of the objects in the present invention is to provide a generic solution to displaying a record on a small screen from a structured database with minimum keystrokes on a limited input interface.

Other objects, together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings, in which:

FIGS. 1A to 1C illustrate respectively a display screen for a scrolling process;

FIGS. 3A to 3L, 4A to 4B, 5A to 5C and 6A to 6E illustrate respectively a sequence of screen displays used in description of the present invention;

FIG. 11A illustrates a list of selectable items.

FIG. 11B illustrates the desired item.

DETAILED DESCRIPTION OF THIS INVENTION

Notation and Nomenclature

Figures 2A, 2B:
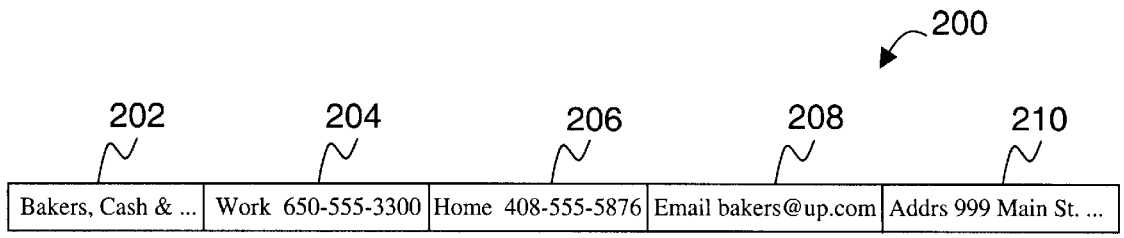
FIGS. 2A to 2B illustrate an exemplary record and a list of items from a structured database used to facilitate the description of the present invention.

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of present invention.

The detailed description of the present invention in the following is presented largely in terms of procedures, steps, logic blocks, processing, and other symbolic representations that resemble of data processing devices including two-way communication interactive devices such as mobile phones, two-way pages, telephones and remote controller with Internet connections. These process descriptions and representations are the means used by those experienced or skilled in the art to most effectively convey the substance of their work to others skilled in the art. The present invention is a scrolling method and apparatus for zoom display, which allows user to scroll a zoom window through a list of items on a small screen. The method along with the apparatus to implement the method to be described in detail below is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

The Preferred Embodiment

In view of the information searching process, prior art solutions for displaying a record from a structured database have attempted to enable a user to adapt to the information being structured and to retrieve the information in a way that the scrolling process works. The scrolling process is capable of providing a successful way for finding and viewing a desired record throughout a structured database and often used in systems with a display device and a full functional keyboard. When a portable device is not equipped with a full functional keyboard but has a small display screen, therein the scrolling process must be used in conjunction with the index lookup process to facilitate an efficient way to obtain some desired information from a structured database with minimum numerical key entries and visual feedback provided in the display screen.

Thus, it is desirable to have a solution for an effective and efficient method for obtaining a desired record from a structured database on a display screen. Obviously, this solution can be advantageously used on portable devices with small screens that may include cellular phones, two-way pagers, palm-sized computers, personal digital assistants and remote control devices.

FIGS. 2A and 2B depict respectively an exemplary record and a list of items from structured database. In order to efficiently and effectively retrieve information from the database, all the records in the database are commonly sorted with respect to the items in a specific order, such as ascending or descending order. According to one specific database, all of the records in the database have a number of fields, such as a first field, a second field, a third field etc. FIG. 2A shows an exemplary record 200 in which the first field information 202 includes a name used as the index of record 200. Second field 204 is a work phone number, third field 206 is a home phone number, fourth field 208 is an email address and fifth field 210 is a home address. It should be pointed out that any field could be used as the index of record 200 and none of the fields have to have information therein. Traditionally, a name, particularly the last name, is used as an index for a record when the database is structured. Furthermore, the number of fields is totally dependent on the application needs. Generally, a database constructed with a fewer number of fields and smaller space for each field is more efficient and practical, especially for those portable devices. FIG. 2B shows a list of 15 items 250 preferably sorted out of an address database, which is indexed with a last name and listed in an alphabetical order. Each index represents a specific record that has at least one information field. As will be appreciated by those skilled in the art, the present invention is not limited to this particularity and can be applied equally well to other databases.

Figure 3A:
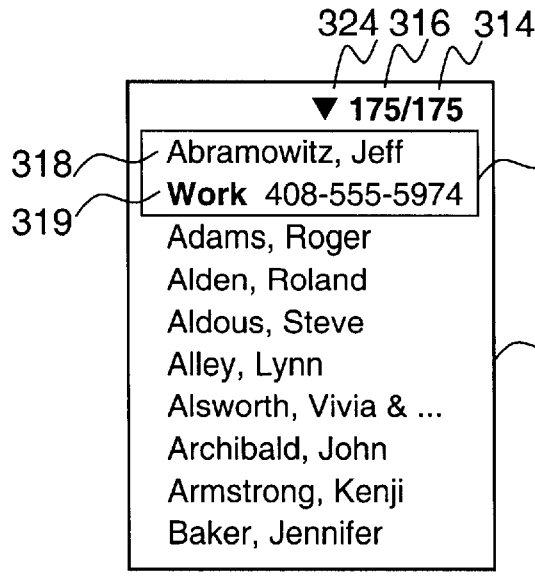

According to the principles of this invention, FIGS. 3A to 3L illustrate a sequence of screens to demonstrate the retrieval of a desired record using zoom scrolling process in conjunction with an index lookup and visual feedback. As shown in FIG. 3A, screen 310 is intended to display a list of items from an address database. Because of the limited size of screen 310, only a first portion of the indexes, 9 items can be displayed. Meanwhile zoom window 311 pre-chooses a first index "Abramowitz" as an initially chosen index and zooms in to provide one field information, a work phone number in the record. Zoom window 311 allows a user to quickly glance at some commonly referred information, such as a work phone number or a home phone number, when being placed on a chosen index.

Figure 3B:
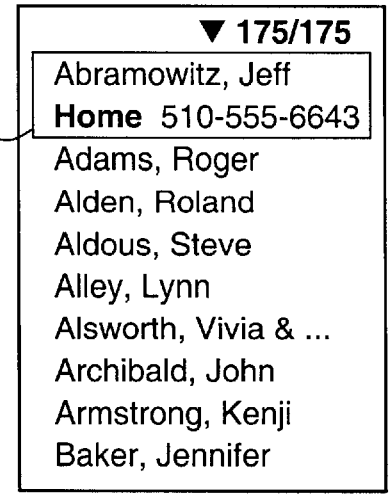
Figure 3C:
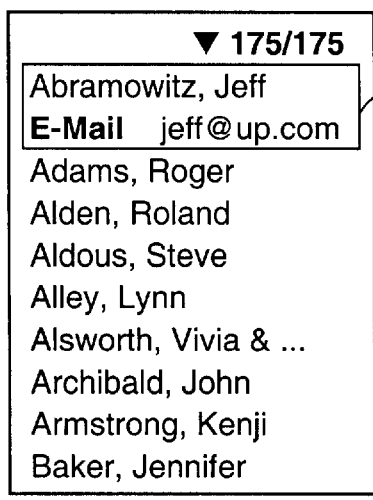
Figure 3D:
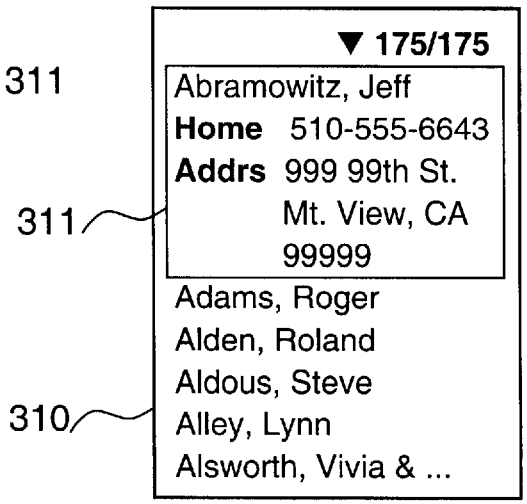

According to one embodiment of this invention, zoom window 311 shows an initially chosen index 318 along with a field 319 of the record. It leaves a visual impression to a screen viewer that zoom window 311 is scrollable and selected at an index of interest. Optionally, zoom window 311 displays more than one fields. The number of fields as well as which field caused to be displayed upon the index being selected, however, does not affect the operation of the invention and largely depends on the actual implementation preference. FIG. 3B to 3D illustrate three exemplary display screens with different zoom window initial setting. In FIG. 3B, zoom window 311 displays an index and a home phone number. Zoom window 311 of FIG. 3C shows an index and an e-mail address, and in FIG. 3D, zoom window 311 displays an index, a home phone number and a home address. Nevertheless, the number of the fields caused to be displayed in zoom window 311 determines the available space to display the rest of the items in screen 310. So it is rational to set the zoom window for displaying only those commonly referred fields. Typically, a user sets the zoom window display content before starting the scrolling process and may reset or change it at any time during the scrolling process. For example, the zoom window is set to display a work phone number in addition to the index and can be shifted, while keeping the index displayed, to display a home phone number using a predefined key. Once the display content in the zoom window has been set, it remains the same during the scrolling process unless the user resets it.

To provide more visual feedback to the user, total index number 314, as well as matched index number 316 are preferably displayed on screen 310 as shown in FIG. 3A. Total index number 314 indicates the number of records in the database. The matched index number 316 tells the number of indexes that are sorted out by a lookup process and zoom window 311 can currently scroll through. Furthermore, an off-screen indicator 324 indicates that there are more items off the current display screen, either above or below the displayed items (by an upward or downward arrow). It should be pointed out that all the indicators, 314, 316 and 324 are not required to practice the present invention rather provide the user some knowledge about the database and the process. It helps the user to determine if a refine query is necessary.

Figure 3E:
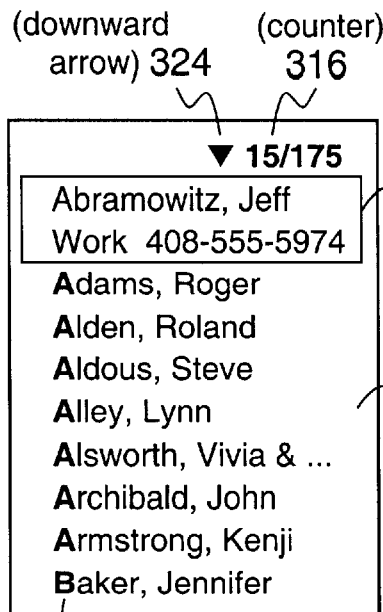
Figure 3F:
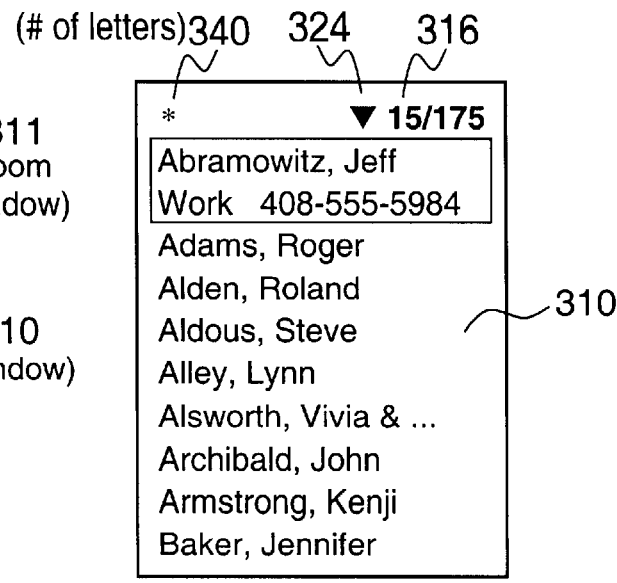

It is assumed that the user wants to view a record indexed by a last name "Bakers". Since the displayed items in screen 310 of FIG. 3A does not include "Bakers", so the user proceeds with a first query using a regular phone keypad. It is noticed that the desired index starts with a character "b", a numeric key "2" is then pressed. Since, numeric key "2" in a phone keypad means "a", "b" and "c", FIG. 3E shows that all items started with "a", "b" or "c" are matched and the first portion of the matched items is displayed. As shown in the figure, matched index number 316 now indicates the number of the matched items per numeric key "2" that is the equivalent to the query "a", "b" and "c". Optionally, zoom window 311 pre-chooses the first index on the list of matched items. Further, the first character 317 in the items is highlighted to provide the visual feedback to the user how many characters have been entered. In some display screens, the characters may not be able to be highlighted. Alternatively, an indicator, for example, an asterisk "*" may be used to indicate that one character has been entered. FIG. 3F shows a possible screen 310 in which one asterisk "*" 340 is displayed, meaning that one query input has been entered. In addition, the off-screen indicator 324 indicates that currently, a list of matched items is not completely displayed and there are more items could be displayed if a cursor or zoom window 311 is moved in the direction indicated by the indicator 324.

It may be noticed that one of the distinctions in the present invention from the prior art systems is that the user is constantly and visually informed of what are the equivalents have been retrieved. In this case, "b" was originally intended, but numeric key "2" results in the equivalence of "a", "b" or "c" entry and the matched index number informs the number of items satisfying the entry. Furthermore, this process allows user to navigate through a list of items and view a chosen index with some of the fields in the record simultaneously. At the same time, user is still able to see items listed adjacent to the current chosen index.

Figure 3G:
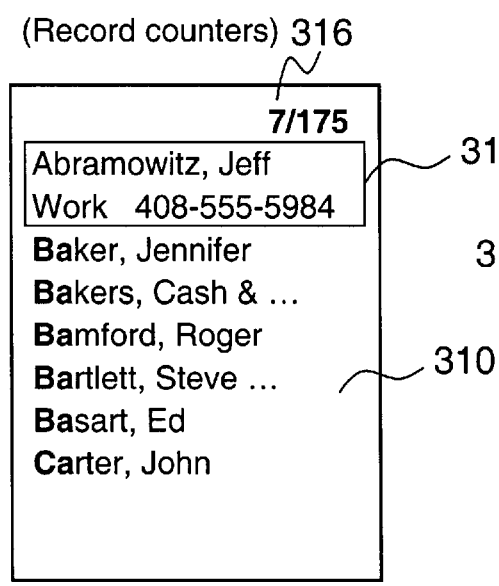

Since the number of matched items is still fairly large, namely the user does not see the desired index in the screen after the first character entry, so a second numeral key "2" is pressed for the second character "a" in the desired index "Bakers". As shown in FIG. 3G, matched index number 316 now indicates the number of the matched items is 7, which means that there are seven items started with the first character being either "a" or "b" or "c" and the second character being either "a" or "b" or "c". Again the first and second characters in the items are highlighted to provide the visual feedback to the user how many characters have been entered. Meanwhile the user determines if there is any need to provide a further query. Typically the user repositions or scrolls zoom window 311 downward to the desired index by a special key (as a navigation key) if the desired index becomes visible in the screen regardless how many are in the matched items. It may be noticeable that the off-screen indicator 324 in previous display screens 310 of FIGS. 3E to 3F is disappeared from FIG. 3G because the matched items are all displayed on screen.

Figure 3H:
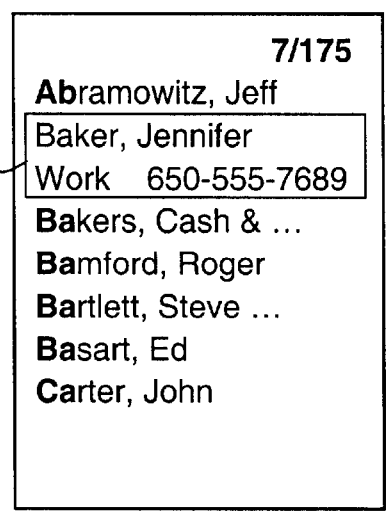
Figure 3I:
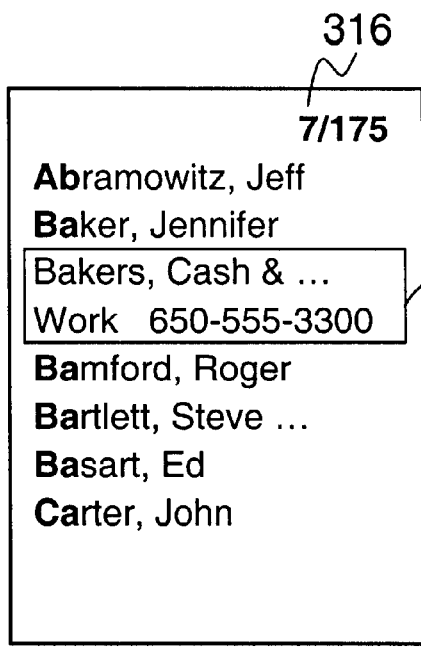
Figure 3J:
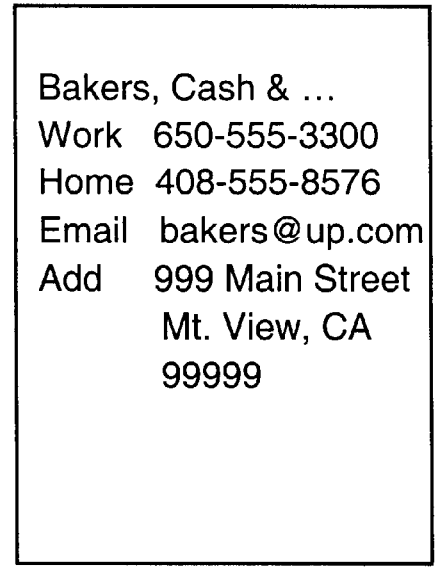
Figure 3K:
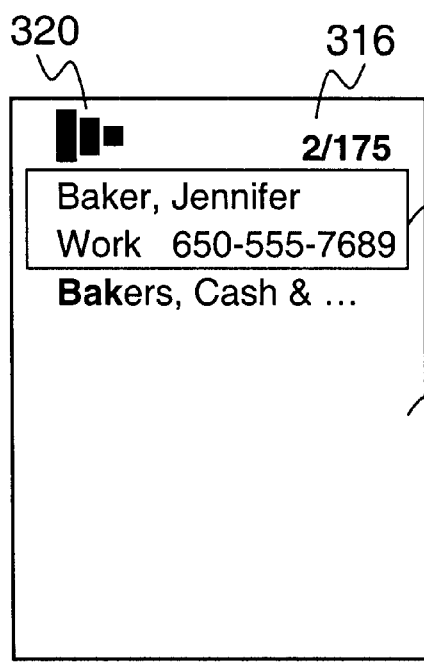

As shown in FIG. 3G, screen 310 does include the desired index "Bakers", so the user may scroll zoom window 311 downward passing index "Baker, Jennifer" of FIG. 3H, to the desired index "Bakers" as shown in FIG. 3I. Upon positioning on the desired index "Bakers", zoom window 311 displays the desired index along with a field. If the user desires to view the whole record, a predefined key can be pressed to display the full record as shown in FIG. 3J. Alternatively, the user may press a numeric key "5" for a third character "k" to refine the retrieval process. FIG. 3K shows screen 310 now displays only two matched items 316, that start with the first character being "a", "b" or "c", the second character being "a", "b" or "c" and the third character being "j", "k" or "l", or satisfy the entries of the numeric keys "2", "2" and "5". The user now needs to scroll zoom window 311 downward by one index to choose the desired index and explore the record if desired. Optionally, a narrow-down sign 320 may be displayed on display screen 310. Narrow-down sign 320, an exemplary indicator, is structured by several rectangular bars in different height. Each bar indicates a list of matched items corresponding to each character entered and the height of the bar graphically correlates to the number of matched items. Generally, the number of matched items becomes progressively smaller for every entered character, the heights of the bars are shortened accordingly.

More particularly, sign 320 in FIG. 3K shows that three entries have been entered and the number of matched items is decreasing. It indicates to the user that the lookup process per each entry is successfully proceeded, and number of matched items has been narrowed down to a very small number. It should be pointed out that this optional indicator is not a quantitative indicator rather a qualitative indicator to leave a visual impression to the user how well the entries has been processed. In other words, if the user enters a character that none of the left items can be matched with, sign 320 remains unchanged, indicating an invalid or void entry.

Figure 3L:
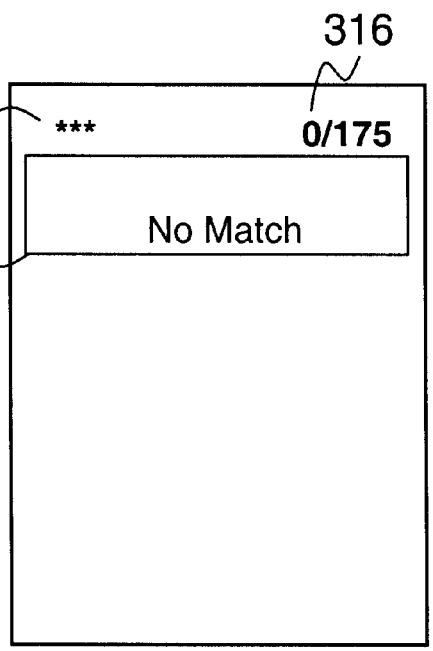

FIG. 3L demonstrates a display resulting from an entry after three successful keystrokes. For example, the user enters "t" which corresponds to a numerical key "8". It can be seen that none of the two left items in FIG. 3K can be matched to the equivalent entries "t", "u" and "v". Thus zoom window 311 has "no match" record to display and sign 340 remains unchanged. The user may undo the latest entry by activating a predefined key to start a new query.

In comparing FIG. 3G with FIG. 3H and FIG. 3H with FIG. 3I, when zoom window 311 makes each step of scrolling through the index list, only two lines on the screen display are actually changed. Noticeably, it is one of the objectives of the present invention to zoom in a chosen index to a next adjacent index with minimal degree of visual disturbance. The visual continuity is optimized since the fewest possible lines on the screen are changed and the screen viewer does not experience a sense of jarring motion when navigating on a small screen. It may be appreciated that the disclosed zoom scrolling process through a manageable number of items is more desirable and practical. Especially, it is ideal to apply the zoom scrolling process after a preliminary searching process, for instance, the index lookup process.

To further facilitate the understanding of the invention, it is assumed that a screen, such as screen 310 of FIG. 3A, has n display lines, e.g. n=10, and a zoom window has k display lines, generally k<n. Typically a zoom window has at least two display lines, one for the index and the other for a selected field of a record indexed by the index. Zoom window 311 of FIG. 3A shows k=2. As a result, only n−k+1 indexes (i.e. 9 indexes in FIG. 3A) could be displayed. It is understood to those skilled that n is known or provided by characteristics of a display screen and if k is increased to display more fields of a selected record in a zoom window, the number of indexes that could be displayed in a screen with n display lines will be decreased accordingly.

As a specific example, zoom window 311 is shown as a zoom window of k=2 in which an index 318 and a field 319 are displayed when the item "Abramowitz, Jeff" is selected. Generally, to ensure that the user sees what is being selected, the index or the item itself is preferably displayed in the zoom window together with one or more fields, hence the actual number of fields in a record that can be displayed in the zoom window is k−1.

Figure 4A:
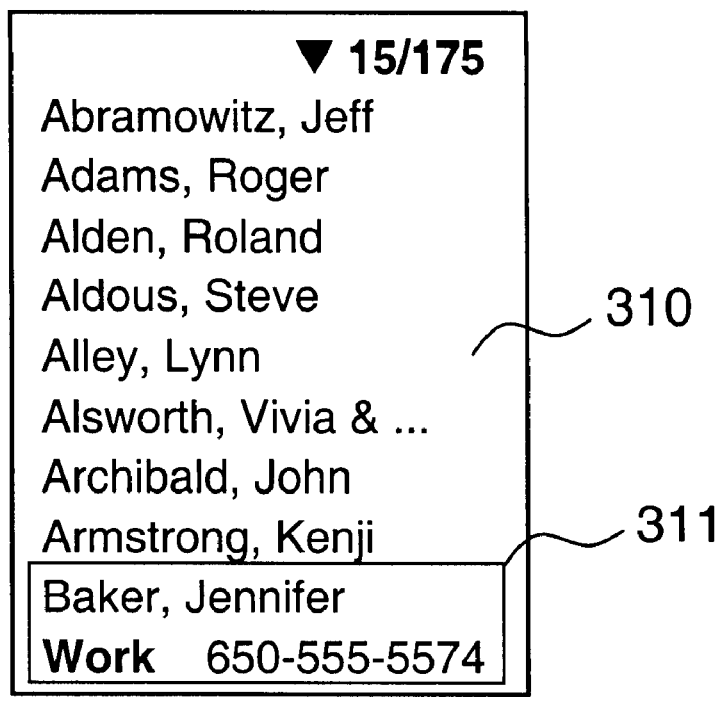
Figure 4B:
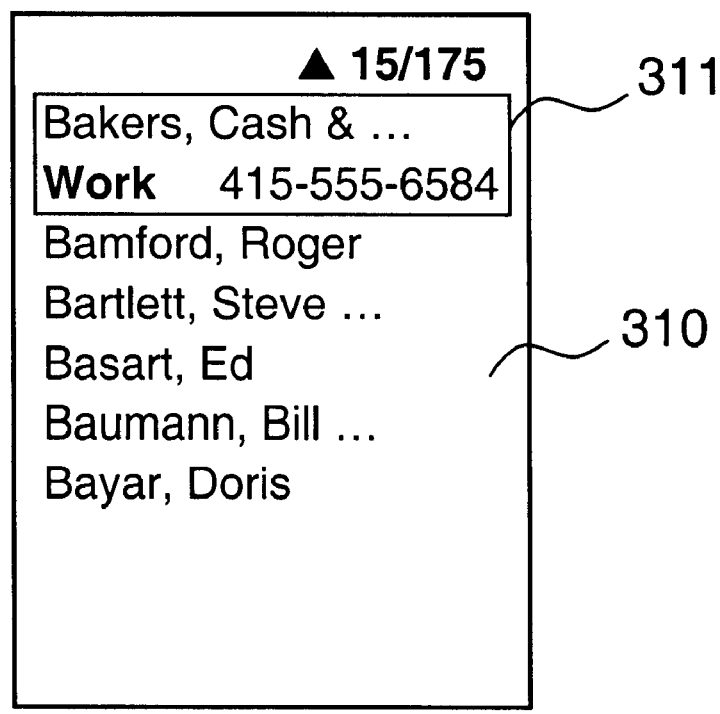

Under certain circumstance, a user scrolls zoom window through a rather long list of items which can not be all displayed in one display screen. FIGS. 4A to 4B illustrate an optional feature when zoom window 311 is scrolled from the last index on the screen into the next adjacent index off the screen. FIG. 4A shows the zoom window 311 being scrolled into the last index, "Baker, Jennifer" on the screen 310. In FIG. 4B, zoom window 311 is scrolled downward by one index, the adjacent index "Bakers, Cash & . . . " has been zoomed in. Now the zoom window 311 is placed on the top portion of the display screen 310 and the zoom scrolling process may continue. Obviously, this process can be continued throughout a fairly long list of items. On other hand, zoom window 311 may be scrolled upward throughout the index list.

FIGS. 5A to 5C demonstrate another optional feature for this invention. It allows user always to see indexes adjacent to the currently zoomed or chosen index. FIG. 5A shows zoom window 311 scrolled into the index next to the last index on the display screen 310. FIG. 5B shows scrolling the zoom window downward by one index. Clearly, by using this scrolling and display method, a user can always see both items located above and below the zoomed index. FIG. 5C shows that zoom window 311 is scrolled into the last index, "Bayar, Doris" on the list (referring to FIG. 2B). Further scrolling downward would not be accepted and the only possible scrolling direction is upward.

Figure 6E:
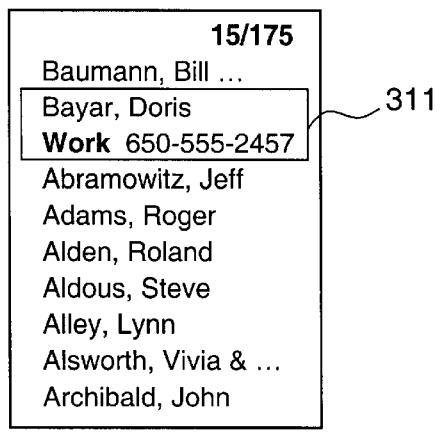

FIGS. 6A to 6E demonstrate one more optional feature. It provides user the possibility for bidirectional continuous zoom scrolling over a list of items on the display screen. FIG. 6A shows initial display screen 610, which corresponds to display screen 310 of FIG. 3A. Zoom window 311 is placed on "Abramowitz, Jeff" in both displays 310 and 610, but there is an index "Bayar, Doris" 680 displayed above the zoom window on screen 610. Index "Bayar, Doris" 680 is the last index on the list of 15 matched items (referring to FIG. 2B). With the last index concatenated to the first index, all 15 matched items are displayed as a "closed loop". FIG. 6B shows zoom window 311 scrolling to the second to the last index on the screen. Now, the next downward adjacent index is "Armstrong, Kenji" and FIG. 6C shows it has been zoomed in zoom window 311. The zoom window is moved onto the top portion of the display screen. FIG. 6C to 6D demonstrates further in-screen downward scrolling process. From FIG. 6D to FIG. 6E, it illustrates another out-screen scrolling and the zoom window moved downward to next adjacent index off screen. In FIG. 6E, zoom window 311 is positioned on the last index "Bayar, Doris" on the matched items list. At this moment, the scrolling loop has been completed. It should be pointed out that, since the list of matched items is displayed as a closed loop, this zoom scrolling process can be performed bi-directionally and continuously. At the same time, both items listed above and below the zoom window can always be observed.

Figure 7:
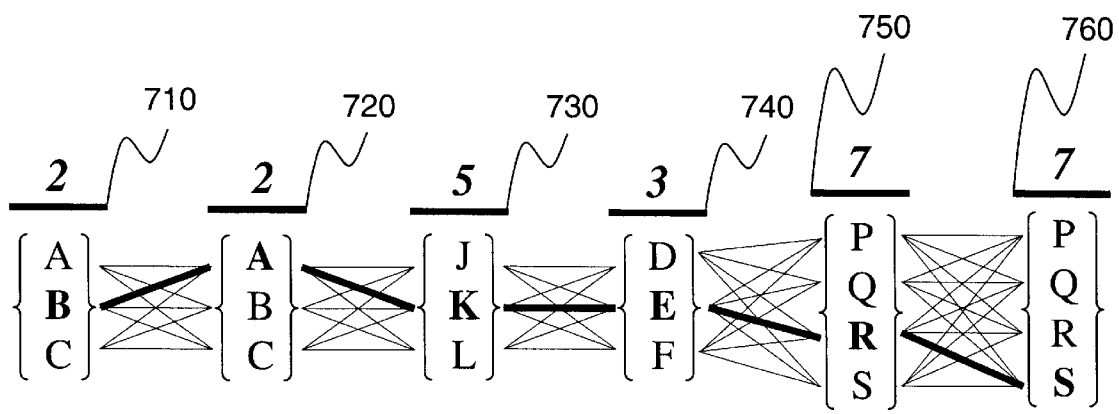
FIG. 7 demonstrates an inherent process with respect to entries provided by a user through an input interface.

FIG. 7 illustrates a look-up process working in concert with each of the entries described above and should be understood in conjunction with FIGS. 3A to 3L. The look-up process may be implemented with reference to the indexed sequential search or binary search, which are well known to those skilled in the art. When the first keystroke "2" is entered, the look-up process proceeds with a query 710 equivalent to three entries "a", "b" or "c" and returns all items starting with "a", "b" or "c". When the second keystroke "2" is entered, the look-up process proceeds with a query 720 equivalent to nine entries "aa", "ab", "ac", "ba", "bb", "bc", "ca", "cb" or "cc" and returns all items starting with "aa", "ab", "ac", "ba", "bb", "bc", "ca", "cb" or "cc".

As described above, the purpose of the keystroke is to bring the desired index into the screen so that a user visually knows where to scroll the zoom window. If the desired index is still not shown in the screen, then an additional keystroke "5" is entered, which causes the look-up process to return all items starting with the following string:

"aaj", "abj", "acj", "baj", "bbj", "bcj", "cbj", "ccj",
"aak", "abk", "ack", "bak", "bbk", "bck", "cak", "cbk", "cck"
"aal", "abl", "acl", "bal", "bbl", "bcl", "cal", "cbl" or "ccl".

Numerically, the number of combinations of the queries is increased with any additional keystroke entries. Practically, the number of the items that match any of the queries is substantially decreased because the match is much more restrictive. Therefore, the number of the matched items returned by the look-up process is substantially decreased with any additional keystroke entries, which eventually brings the desired index to the screen with only a few keystrokes.

For completeness, although unlikely in practice, additional keystrokes 730, 740, 750 and 760 will guarantee to cause the desired index "bakers" to be displayed on the screen. The thick line in the figure shows the actual combination of the keystrokes that leads to the desired index.

It should be pointed out that the above description is equally applied when a user enters a string of characters without looking at the screen. For example, "225377" may be successively entered to retrieve particularly the record indexed by "bakers".

Figure 8:
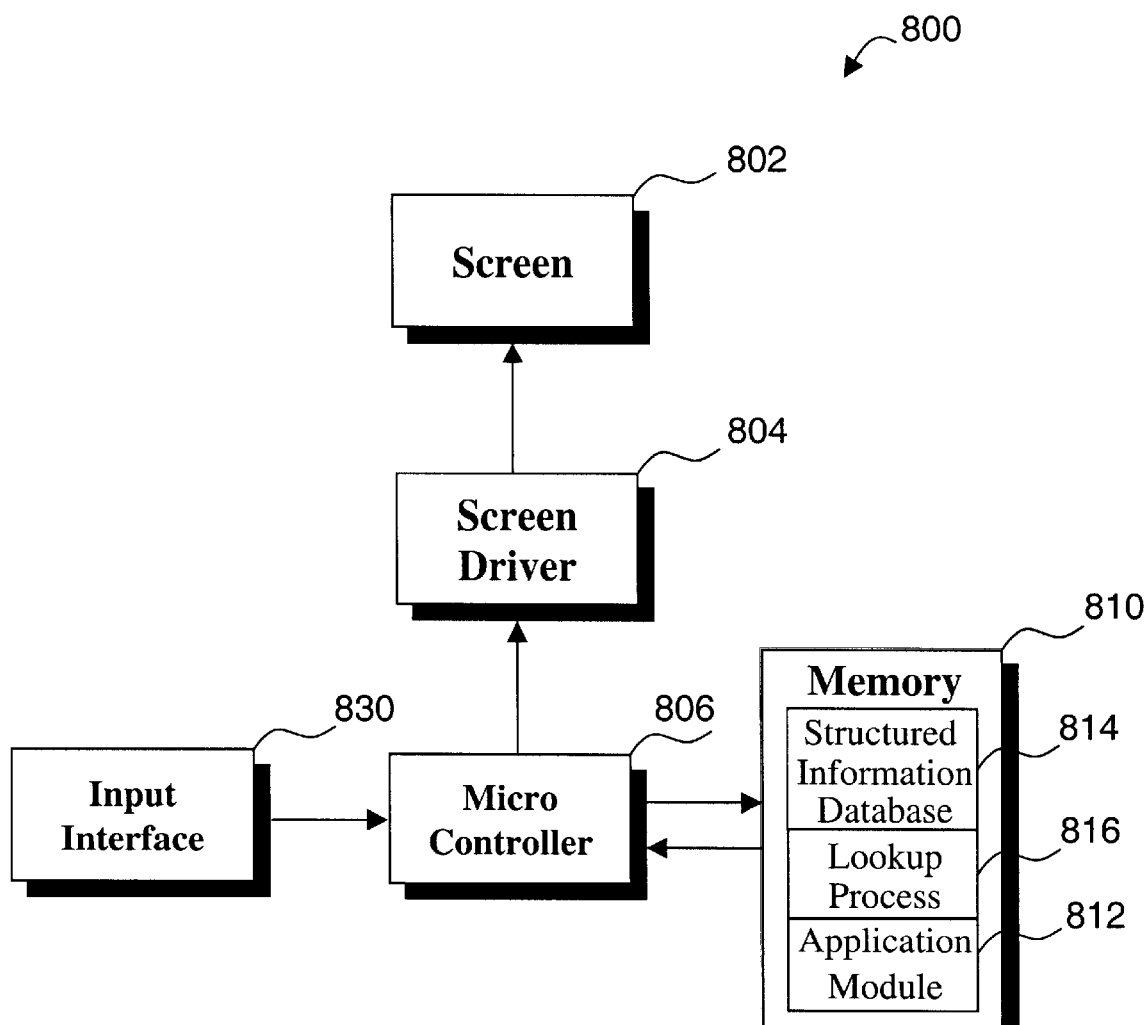
FIG. 8 shows an internal functional block diagram of a portable device in which the present invention may be practiced.

FIG. 8 illustrates an internal functional block diagram of a portable device 800 in which the present invention may be practiced. Portable device 800 may include, but not be limited to; a cellular phone, a two-way pager, a palm-sized computing device and a personal digital assistant, and has a small screen 802 that may be a LCD screen. Screen 802 is communicated with and commanded by a screen driver 804 that is controlled by a micro-controller (processor) 806. Memory 810 includes a compiled and linked version of one implementation of the present invention as an application module 812. When micro-controller 806 executes application module 812, screen driver 804 is caused to generate control signals to drive screen 802 to display according to application module 812.

According to one implementation, a structured database 814 is loaded in memory 810 that further includes code for a lookup process 816.

When device 800 is powered on, both application module 812 and lookup process 816 are executed on micro-controller 806. Input interface 830 coupled to and controlled by micro-controller 806 receives inputs (queries) from a user. It should be pointed out that database 814 does not have to be physically located in a local device, it may be located in a remote proxy server. Screens in FIGS. 3A to 3L are some of the examples that are caused to be displayed by screen driver 804 according to application module 812 in conjunction with lookup process 816 with respect to the queries.

As described above, input interface 830 may be a phone keypad. It should be pointed out that a regular phone keypad is not the only input interface that can practice the present invention. Some of portable devices sometimes have no physical keys at all, such as those palm-size computing devices that, however, use soft keys or icons as an input means for users to interact with the devices. In the above description, unless otherwise specifically described, it is clear that keys or buttons are generally referred to as either the physical keys or soft keys.

Figure 9:
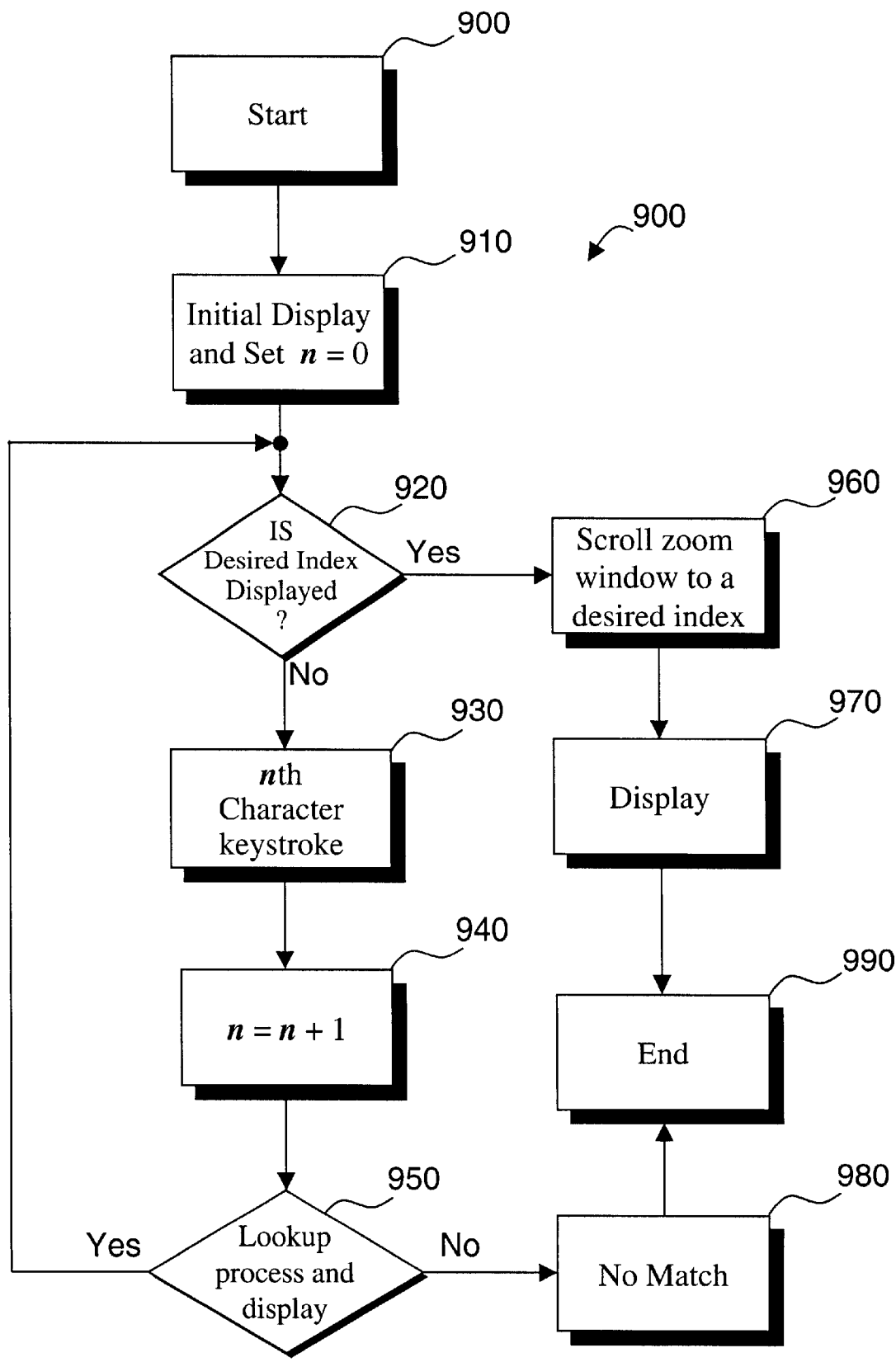
FIG. 9 illustrates a flowchart diagram for the index lookup process in the present invention.

FIG. 9 illustrates a flowchart of an index lookup process that may be used to practice the present invention and shall be understood in conjunction with FIG. 8. At 900, a portable device is powered on or the lookup process is activated. A first portion of items from the database is displayed on the screen and a counter is set to zero at 910. The counter records the number of the character entries and can be used to indicate to a user how many characters have been entered.

At 920, the user determines if a desired index is among the items being displayed. When the desired index is not displayed, the user enters a character query at 930. The counter is incremented by one every time the user enters a character query at 940. The look-up process proceeds at 950 with the entered character and returns to 920 all items that start with the entered character and all precedent characters. If the look-up process fails to identify any index in the database that must match the entered character and all precedent characters, an error message is displayed at 980.

Back to 920, the desired index is among the indexes being displayed. So the user can scroll the zoom window to the desired index in a known direction at 960. It is described that the zoom window displays an index and preferably a field of a record when the zoom widow is being scrolled over from one index to another (adjoining items) till the desired index. In other words, the zoom window displays an index and one or more associated fields whenever it is placed upon the index. At 970, a full record indexed by the desired index can be displayed if a predefined key is activated.

Figure 10:
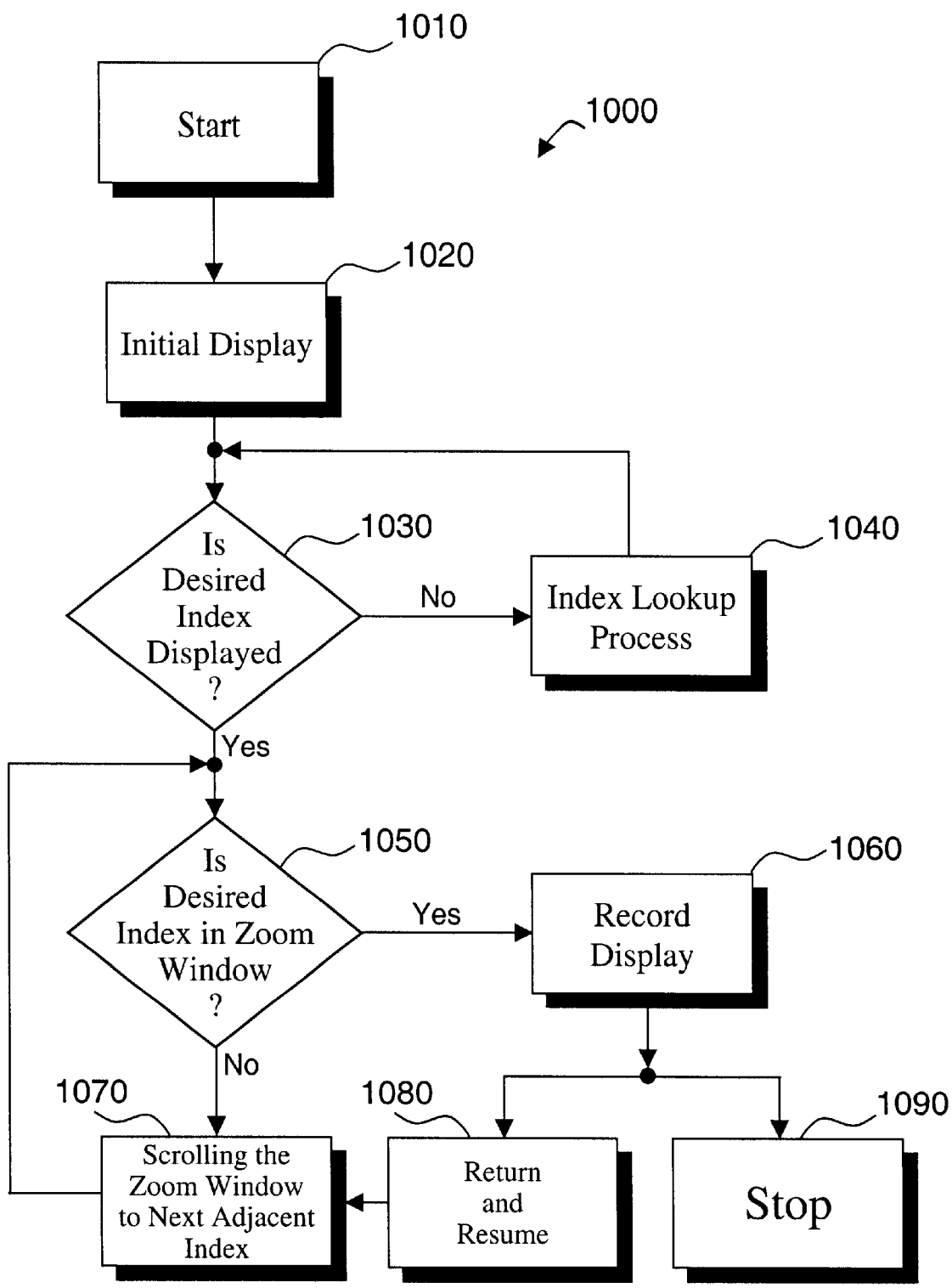
FIG. 10 illustrates a flowchart diagram of scrolling a zoom window in the present invention according to one embodiment.

FIG. 10 illustrates a flowchart 1000 of the zoom scrolling process in the present invention according to one embodiment and shall be understood in conjunction with FIG. 8. At 1010, the zoom scrolling process is started. Based upon the number of items on the displaying list, either a portion of items or entire list of items from the database is displayed and the zoom window is initially placed onto an index on the display screen at 1020. Then, the user determines if a desired index is among the items being displayed at 1030. When the desired index is not displayed, the user proceeds with an index lookup process to progressively narrow down the number of items that would be scrolled over by entering one or more queries at 1040. Otherwise, the user determines whether the desired index is zoomed at 1050. When the desired index is not seen inside the zoom window, the user may scroll the zoom window into an adjacent index at 1070 in a known direction until the desired index is chosen and displayed in the zoom window. As soon as the desired index is in the zoom window 1050, the user may either alter a setting to view a different field or press a predefined key to view the full record at 1060. After that, the user can either return to the previous screen to resume the zoom scrolling process at 1080, or just quit the process at 1090.

There are many advantages and benefits of the present invention that can be appreciated by those skilled in the art. According to the principles of this invention, it is disclosed a method and apparatus for displaying a record from structured information with zoom scrolling and minimum keystrokes. Consequently, a user of a portable device with a small screen and a limited input interface can access and display a certain record from a database quickly and efficiently.

It is understood to those skilled in the art that the present disclosure of embodiments has been made by way of example only and that numerous changes in the arrangement and combination of parts as well as steps may be resorted without departing from the spirit and scope of the invention as claimed. For example, the database herein may be a list of selectable items as shown in FIG. 11A, each item has a display width larger than the width of a screen. In this case, only one item, the desired item 1100, needs to be fully displayed when selected, namely it will occupy multiple lines for display. FIG. 11B shows that the desired item is selected by a cursor, or preferably a zoom window 311. Only the selected item is displayed and the rest of the unselected items are partially displayed. As described above, when zoom window 311 is moved to is another item, the desired item 1100 will be partially displayed and the newly selected item is then displayed in zoom window 311. Those skilled in the art understand that the exemplary list can be viewed as a list of records and sorted based on a piece of information representing the record and the piece of information may be deemed as an index. Hence the above descriptions can be equally applied. Accordingly, the scope of the present invention is defined by the appended claims rather than the forgoing description of embodiments.

We claim:

1. A method for displaying a desired record from a structured database in a screen, said desired record including a first field and a second field and indexed by a desired index comprising a string of characters, said method comprising:
   receiving a list of items, each of said items indexing a record in said structured database, wherein one of said items is said desired index;
   indicating said desired index with a zoom window when said zoom window is scrolled to said desired index, wherein said zoom window displays at least said first field along with said desired index; and
   displaying in said screen as many of said items in a predefined order as said screen is able to accommodate together with said zoom window.

2. The method as recited in claim 1, wherein said displaying in said screen as many of said items in a predefined order as said screen is able to accommodate comprises:
   displaying a first portion of said items in said screen; and
   indicating a first index in said items being displayed with said zoom window so that a user knows where to start to scroll said zoom window to said desired index in said predefined order.

3. The method as recited in claim 2, said method further comprising:
   receiving a first symbol from an input interface if said desired index is not among said items being displayed in said screen; wherein said first symbol represents a first group of characters one of which is a first character in said string of said desired index; and
   performing a lookup process with said first symbol to produce a list of first chosen items that start with any said characters in said first group represented by said first symbol.

4. The method as recited in claim 3, wherein said method still further comprises:
   displaying a first number indicating a total number of said items in said database and a second number indicating a number of said first chosen items.

5. The method as recited in claim 4, wherein said method still further comprises:
   moving said zoom window across at least one of adjoining items to said desired index when a first predefined key in said input interface is activated.

6. The method as recited in claim 5, wherein said moving said zoom window across at least one of adjoining items to said desired index comprises:
   displaying in said zoom window a field of an adjoining record indexed by said at least one of said adjoining items when said zoom window moves across said at least one of said adjoining items.

7. The method as recited in claim 6, said method further comprising:
   refreshing said screen with only said desired record being displayed after a second predefined key is activated.

8. The method as recited in claim 7, wherein said input interface is a phone keypad comprising a plurality of numeric keys; and wherein said first symbol is one of said numeric keys.

9. The method as recited in claim 3, said method further comprising:
   receiving a second symbol from said input interface if said desired index is not among said first chosen items being displayed in said screen; wherein said second symbol represents a second group of characters one of which is a second character in said string of said desired index; and
   performing said lookup process with said second symbol to produce a list of second chosen items that start with any said characters in said first group re presented by said first symbol followed by any said characters in said second group represented by said second symbol.

10. The method as recited in claim 9, said method still further comprising:
    updating said screen with a list of said second chosen items.

11. The method as recited in claim 3, said method still further comprising:
    receiving, successively and respectively, subsequent symbols till said desired index is caused to be displayed in said screen.

12. The method as recited in claim 1, wherein said indicating said desired index with a zoom window comprises:
    said zoom window displaying therein interchangeably said second field along with said desired index when a shift key is activated.

13. A method for displaying a desired record from a structured database in a screen having n display lines, said desired record including at least a first field and a second field and indexed by a desired index comprising a string of characters, said method comprising:
    receiving a list of items, each of said items indexing a record in said structured database;
    setting a zoom window having k display lines in response to a sequence of keys in an input interface activated by a user; wherein k is at least 2;
    displaying in said screen n−k+1 items of said items in a predefined order together with said zoom window;
    indicating said desired index with said zoom window by scrolling said zoom window to said desired index, wherein said zoom window displays therein at least said first field along with said desired index.

14. The method as recited in claim 13, wherein k can be enlarged to display in said zoom window a full record in said structured database.

15. The method as recited in claim 14, wherein said displaying in said screen n−k+1 items of said items in a predefined order comprises:
    displaying said zoom window over an initial index in said n−k+1 items; wherein said zoom window extends to display said initial index and k−1 fields of a record indexed by said initial index.

16. The method as recited in claim 15, wherein said indicating said desired index with a zoom window comprises:

moving said zoom window being positioned over said initial index across at least one of adjoining items to said desired index when a predefined key in said input interface is activated, wherein said window displays therein said at least one of said adjoining items and k−1 fields of a record indexed by said at least one of said adjoining items.

17. The method as recited in claim 16, wherein said initial index is one of a first index and a last index being displayed in said screen.

18. The method as recited in claim 17, wherein said input interface is a set of displayed keys displayed in said screen.

19. An apparatus for displaying a desired record from a structured database, said desired record including a first field and a second field and indexed by a desired index comprising a string of characters, said apparatus comprising:

a screen capable of displaying n items, each corresponding to a record in said structured database;

a screen driver commanding and causing said screen to display accordingly;

an input interface;

a memory for storing code for an application module and a structured database;

a processor coupled to said screen driver, said input interface and said memory, said processor executing said code in said memory to cause said application module to drive said screen driver for:

setting a zoom window, in response to a sequence of keys in said input interface activated by a user; to display therein an index and k fields of a chosen record;

displaying n−k+1 items from a list of ordered items in a predefined order together with said zoom window; and indicating said desired index with said zoom window when said zoom window is scrolled to said desired index, wherein said zoom window displays therein at least said first field of said desired record along with said desired index.

20. The apparatus as recited in claim 19, wherein said processor executes said code in said memory to cause said application module to receive a list of chosen items when a user activates a key in said input interface; wherein said key represents a number of different characters one of which corresponds to a first character of said desired index.

21. The apparatus as recited in claim 20, wherein said ordered items are said chosen items.

22. The apparatus as recited in claim 21; wherein said zoom window is initially placed upon an initial index before being scrolled to said desired index and wherein said zoom window displays therein said initial index and at least a field of a record indexed by said initial index.

23. The apparatus as recited in claim 22; wherein said zoom window displays respectively each of adjoining items along with at least a field of record indexed by said each of said adjoining items when said zoom window is scrolled to said desired index.

24. The apparatus as recited in claim 23; wherein said input interface is a phone key pad.

25. The apparatus as recited in claim 23; wherein said input interface is a plurality of displayed keys in said screen, each of said keys representing a number of different characters.

* * * * *